United States Patent [19]
Allen et al.

[11] 3,813,655
[45] May 28, 1974

[54] MONITORING SYSTEMS AND APPARATUS THEREFOR

[75] Inventors: Howard John Brandsom Allen, West Lothian; James Neill Johnston, Edinburgh, both of Scotland

[73] Assignee: Microwave and Electronic System Limited, Newbridge, Midlothian, Scotland

[22] Filed: May 23, 1972

[21] Appl. No.: 256,047

[30] Foreign Application Priority Data
May 24, 1971 Great Britain.................. 16760/71

[52] U.S. Cl. ......................... 340/151 R, 340/150 R
[51] Int. Cl. ............................................ H04q 9/00
[58] Field of Search .................... 340/151 R, 224 R

[56] References Cited
UNITED STATES PATENTS

| | | | |
|---|---|---|---|
| 3,164,771 | 1/1965 | Milford | 340/151 |
| 3,299,403 | 1/1967 | Young | 340/151 |
| 3,654,605 | 4/1972 | Honda | 340/151 |
| 3,757,315 | 9/1973 | Birchfield | 340/224 |

Primary Examiner—Harold I. Pitts
Attorney, Agent, or Firm—Sughrue, Rothwell, Mion, Zinn & Macpeak

[57] ABSTRACT

A central station monitors the condition of a group of remote sensors each of which is connected in a reporter unit which generates a characteristic frequency signal the modulation condition of which is changed when the sensor goes into the alarm condition. The central station scans the characteristic frequencies and detects the nature of the modulation received at each. The absence of a signal at any of these frequencies is also detected. The characteristic frequencies are generated by crystal-controlled oscillators and the central processor includes a digital filter locked to a crystal-controlled reference oscillator to give high immunity to noise. The wanted signals may be deliberately hidden in the signals of a noise or swept frequency source.

21 Claims, 2 Drawing Figures

MONITORING SYSTEMS AND APPARATUS THEREFOR

BACKGROUND OF THE INVENTION

1. Field of the Invention

This invention relates to a monitoring system and to a signal scanning circuit which find particular, though not exclusive, use in such a system. The invention has particular utility in the field of security systems.

In the field of providing security alarms against intruders into a space which is to be protected it is known to use various types of sensors to detect the presence of an intruder. For example, microwave or ultrasonic radiation apparatus may survey a volume of space to detect the movement of intruders. A door or window may be fitted with switch devices responsive to the opening of the door or window. Photoelectric or infrared detectors may be provided to sense the movement of an intruder past a given point. Inertia switches may be used to sense the disturbance of a valuable article. In a complete security installation covering, for example, a whole building a combination of sensors may be required to be used together. It is thus desirable to provide a system in which the condition of all the sensors is monitored. In addition such a system can be used to monitor fire sensors, a temperature or pressure sensor in a boiler house, or any sensor associated with a service in the building.

In one aspect the invention proposes a monitoring system comprising a plurality of detector arrangements each having a sensor associated therewith and each being activatable by the associated sensor to provide a signal characteristic of that arrangement whereby it is distinguished from the remainder of said detector arrangements, a signal processing unit and means providing communication between each of said detector arrangements and said signal processing unit to transmit said characteristic signals thereto, said signal processing unit comprising discriminator means for selectively monitoring said characteristic signals to indicate the presence of such a signal.

2. Description of the Prior Art

The detector arrangements may be all connected to the processing unit through a single cable the various detector arrangements being tapped into the cable at convenient points. This cable may be specially installed for the purpose. Alternately the local mains wiring can be used, particularly where a ring mains is installed. Another possibility is the use of telephone cables within a building. By using mains wiring, for example, the system can be installed over a wide area and different buildings brought into the one system if desired.

The detector arrangements may be distinguished in various ways: by signals which are different in the time domain or frequency domain. At present the latter is preferred. The detector arrangements are allocated different operating frequencies, which preferably are different carrier frequencies but which could be different modulating frequencies on a basic carrier frequency, and the discriminator of the signal processing unit in this case is a filter for separating the different frequencies. To provide a continuous monitoring the signal processing unit is arranged to scan the signals of the detector arrangements cyclically.

SUMMARY OF THE INVENTION

In the application of the invention to a security system it is desirable that the processing unit be able to distinguish three signal conditions from each detector arrangement, namely normal; alarm; and fault. To this end the normal signal may be a pulsed carrier (pulsed CW); the alarm signal may be a continuous carrier (CW) at the allocated frequency; and the fault signal may be the absence of a signal at the allocated frequency. A fault signal can thus be due to an operational fault in the system or to a deliberate tampering with the detector arrangement.

A further aspect of the invention stems from the requirements of the signal processing unit to perform a cyclic scan of the signals from the detector arrangements and to indicate the nature of the scanned signals. With this in view the invention further provides a frequency scanning arrangement comprising a digital filter; a frequency source coupled to said filter to control the filter frequency of said digital filter, said source including a programming unit whereby the filter frequency is selectable to one of a plurality of prescribed frequencies according to a prescribed programme, a clock source connected to said programming unit to cause the latter to advance through its programme to cause said digital filter to scan the prescribed frequencies according to the programme, and analyser means coupled to said clock source and to the output of said digital filter, said analyser means having a plurality of outputs each associated with a respective one of said prescribed frequencies and being stepped by the clock to provide signals sequentially at said outputs in synchronism with the selection of the prescribed frequencies in the digital filter, and said analyser means being operable to analyse the signal at the output of said digital filter at each prescribed frequency thereof and to produce a signal on the associated output indicative of the nature of the digital filter output signal (which may include the absence of any signal).

The digital filter can have its succession of operating frequencies locked to the frequency of a crystal-controlled reference oscillator. Concomitant with this measure, the characteristic frequencies generated by the detector arrangements are likewise derived from crystal-controlled oscillators. The frequency stability of the system enables the characteristic frequency signals to be detected in the presence of substantial amounts of noise or other unwanted signals, especially where mains or telephone cable is used as the communications medium between the detector arrangements and the signal processing unit. This feature can be further turned to advantage by applying an "interfering" signal to the communication medium of an amplitude substantially greater than that of the characteristic frequency signals. The interfering signal, for example noise or a swept frequency, has components in the frequency band within which the characteristic frequencies lie making it difficult for an intruder to ascertain these frequencies so as to insert false signals into the system indicating all is well.

BRIEF DESCRIPTION OF THE DRAWINGS

A security system embodying the invention will now be described, by way of example, with reference to the accompanying drawings in which.

DESCRIPTION OF THE PREFERRED EMBODIMENT

Figure 1:
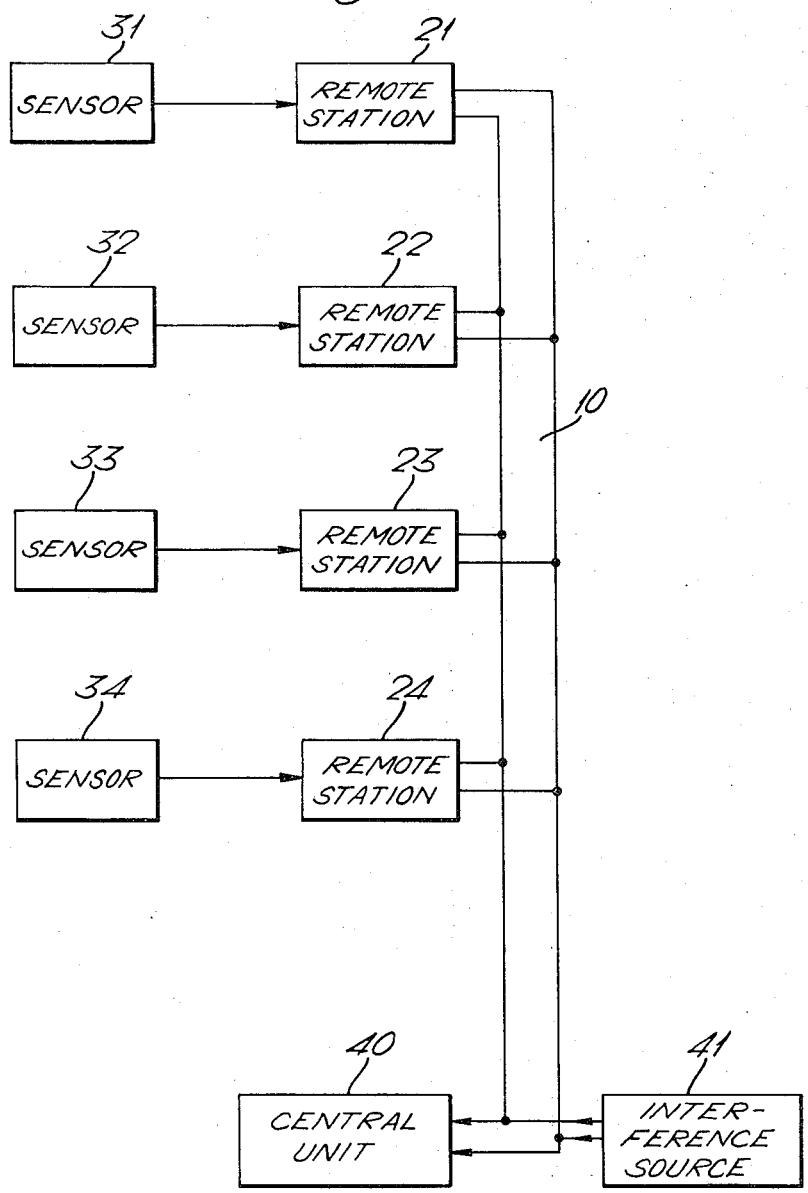
FIG. 1 shows the system in general form.

In FIG. 1 which illustrates a system intended for security against intruders, there is shown a cable 10 which may be a specially installed cable, a part of a ring main, or part of a telephone cable. Into the cable are tapped a plurality of detector arrangements, four such 21 to 24 being shown. These are installed at various points in a building where there is a need to provide an intruder sensor. The detector arrangements are controlled by sensors 31 to 34 respectively each appropriate to the security requirement at the point in question. In some cases the sensor and detector arrangement may be incorporated in a single unit. These arrangements may be conveniently referred to as remote stations or reporter terminals because each is located at or near a remote point at which sensing is effected and the arrangement acts to report the condition of the sensor associated therewith.

It will be assumed that each remote station is operable to generate a frequency specific to that arrangement as by use of a crystal-controlled oscillator. The frequencies may be within the range of 50 to 100 kHz. Taking arrangement 21 as an example, it includes a crystal oscillator at 60 kHz. In the normal (non-alarm) condition of the associated sensor 31, a pulsed CW signal is provided by a modulator acting on the output of the oscillator. In the alarm condition of the sensor 31, the latter inhibits the modulator in unit 21 such that a continuous CW signal is produced for a predetermined period of time. If the unit 21 fails or is deliberately cut-off, then obviously no signal will be produced.

Connected to the cable 10 at some convenient point is central signal processing unit 40. This unit is adapted to scan the frequencies allocated to all the detector arrangements connected to the system and to detect at each frequency the nature of the signal present or the absence of a signal so that when appropriate an alarm or fault condition is given. The frequency scanning is effected cyclically, for example, every two seconds for eight remote stations.

Shown separately for clarity but preferably included in unit 40, is an interference signal generator 41 which places a large amplitude noise or swept frequency signal on cable 10 to mask the signals from the units 21 to 24 as far as an intruder is concerned though as will be described below, it does not interfere with the proper operation of unit 41.

It may be necessary to adopt different security conditions at different times of the day. A strong room for example may be permanently secured but door security may be unwanted during the day when persons on legitimate business within the building are moving about. To this end the processing unit can be settable to ignore alarm signals from the latter type of sensors, though the fault detection facility may usefully be maintained at all times.

In the above system where the cable 10 is the mains wiring the various remote stations can be conveniently mains powered as can the sensor if it requires energisation. Where a special cable is installed the power supplies for the remote stations may be sent from the central unit 40 to the remote stations, conveniently at low voltage e.g., 12 volts. This may be desirable where stand-by emergency batteries are automatically switched in the event of the failure of the mains from which the normal 12 volt power supply unit is powered. It will be noted that any attempt to cut the cable 10 will bring in a fault indication for all remote stations beyond the point at which the cable is cut.

It is of course possible to monitor all the incoming frequencies continuously with the use of a separate filter for each channel. However, the frequency scanning outlined above is preferred and will be described in greater detail below.

The preferred security system of the invention will now be described in greater detail with reference to FIG. 2.

Figure 2:
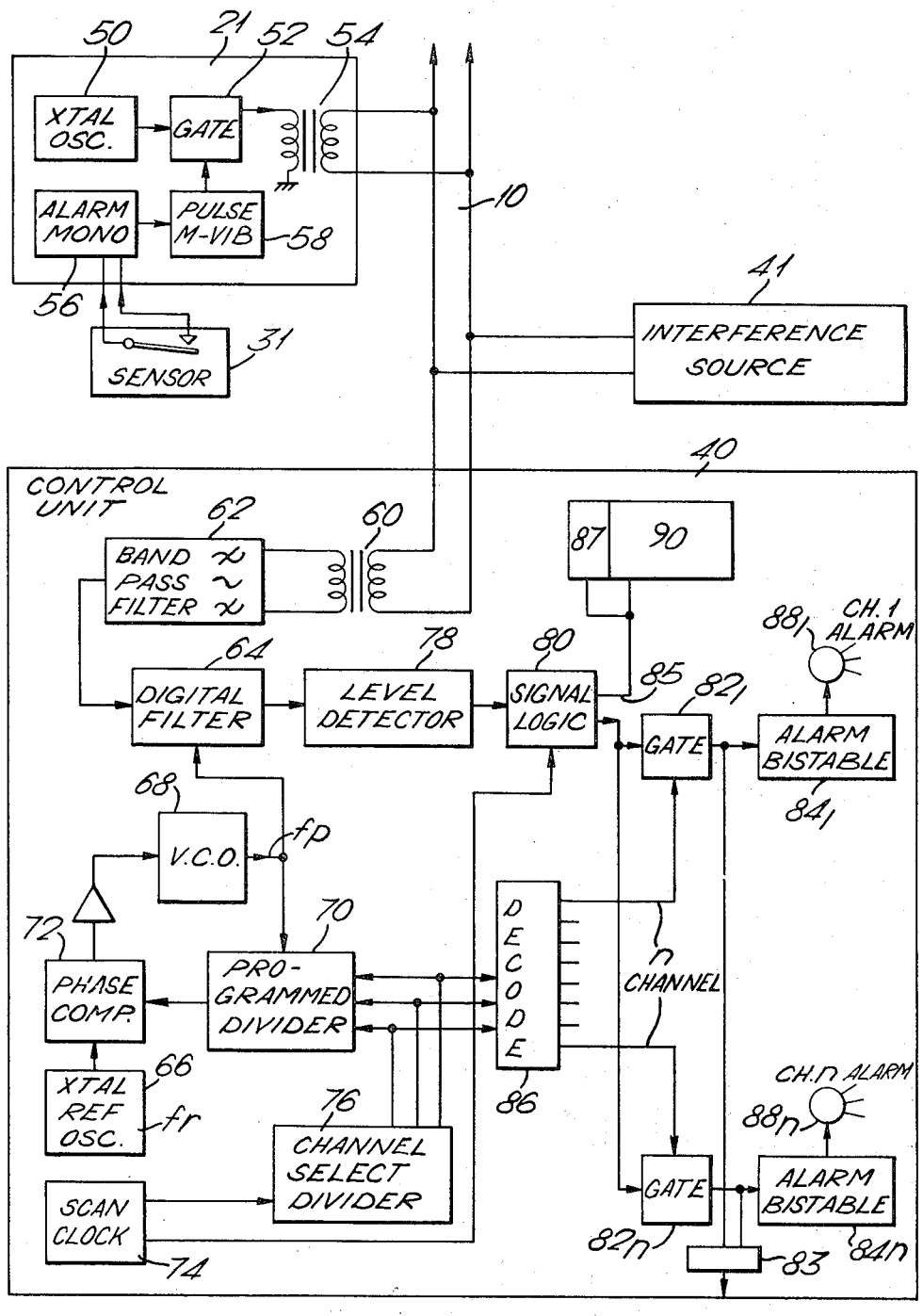
FIG. 2 shows a block diagram of the central-signal processing unit and of one remote reporter unit connected to it.

FIG. 2 shows the processing unit 40 and one of the remote stations (e.g., 21) connected to it together with interfering signal source 41. The other remote stations are of like construction.

The remote station or reporter terminal as it may be termed comprises a crystal-controlled oscillator 50 at a frequency in the 50 to 100 kHz range. The oscillator is coupled to the cable 10 through a gate 52 and isolating transfer 54 (power supply connections are not shown). The gate 52 is controlled by a multivibrator 58 which alternately enables and inhibits the gate so that a pulsed carrier is supplied to the cable 10. The associated sensor 31 when put into the alarm condition activates a timing circuit 56 such as a monostable which is set for a period greater than the frequency scanning period of the control unit 40. During the set period the monostable 56 inhibits operation of the multivibrator 58 which is so coupled to the gate 52 as to ensure that the latter is kept open during this period and a continuous unmodulated signal is provided by the remote station. Thus a pulsed CW signal is the normal condition; a continuous CW signal is the alarm condition; and an absence of signal is a fault condition.

The processing unit 40 comprises an input isolating transformer 60 which feeds a band-pass filter 62 covering the frequency range over which the remote stations are spread. The output of filter 62 passes to the input of a digital filter 64.

To control the instantaneous filter frequency of the filter 64, there is provided a reference crystal-controlled oscillator 66 to which a voltage controlled oscillator (VCO) 68 is locked at prescribed frequencies related to the reference oscillator frequency in a phase-locked loop. The output of VCO 68 is applied to a programmed frequency divider 70 which provides the required frequency division and the divided output is compared with the reference frequency in a phase comparator 72 which applies a control voltage to VCO 68. The output of VCO 68 is applied to the digital filter 64 to control the filter frequency of the latter.

The divider 70 is programmed to provide a preselected programme of division ratios chosen such that each ratio corresponds to VCO 68 providing a signal to filter 64 at the frequency allocated to a respective one of the remote stations. Thus by stepping divider 70 through its programme each remote station frequency is selected in digital filter 64. The stepping of the programme is controlled by a clock source 74 fed into a divider 76 providing a cyclic sequence of outputs in binary coded decimal, for example, equal in number to the programme steps. These outputs are applied to the programmed divider 70 and thus cyclically step it through its programme. Only three outputs are shown which in a BCD coding provide eight steps. Obviously more outputs are provided for greater numbers of channels.

As the digital filter 64 is stepped through the prescribed frequency sequence its output is analysed to detect the nature of the signal at each frequency, i.e., continuous CW, pulsed CW or absence of signal. To this end the digital filter output is applied to a level detector 78 which provides a signal indicating the instantaneous presence or absence of a signal output from the filter. This signal is applied to a signal logic unit 80 in turn controlled by clock source 74.

The signal logic 80 examines the output of each frequency channel for the portion of the clock period allocated to that channel. The signal logic 80 is connected to the inputs of a plurality of gates $82_1$ to $82_n$ each associated with a different remote station and each having its output connected to a respective alarm bistable $84_1$ to $84_n$. The gate 82 are selected sequentially by a decoder 86 in turn controlled by the channel divider 76. This ensures that the gates $82_1$ to $82_n$ are enabled in synchronism with the selection of the respective frequencies in the digital filter of the remote stations with which the gates are respectively associated.

The signal logic 80 responds to a signal including a pulse (or at least a change in level) from level detector 78 by providing a first signal level not activating the inputs of gates 82 which thus remain in the reset state as long as all is normal. The frequency of the multivibrator 58 in each remote station is high enough to ensure at least one change in level during the analysis period. If no change in level is detected by unit 80 in an analysis period it provides a second activating signal level to the gates 82 and that one of the gates enabled at the time causes the associated alarm bistable 84 to be set. Due to the synchronism of between the sequential enabling of gates 82 and the selection of frequencies in the filter 64, the alarm bistable is set which is associated with the sensor which has been put into the alarm condition.

The setting of the alarm bistables may produce a visual output by lighting a lamp 88 and/or aural output. The outputs of gates 82 may be connected to an OR-gate 83 giving a general alarm signal.

The signal logic also has an output 85 for indicating a fault signal resulting from no signal at all in an analysis period. The fault signal output is applied to a plurality of gates, corresponding to gates 82, with associated fault bistables, corresponding to bistables 84, the arrangement 90 being controlled by decoder 96 exactly as with the alarm arrangement. This analogous arrangement is indicated by block 90. A general fault indicator 87 may also be provided.

In practice, the digital filter provides a narrow bandpass at a series of precise frequencies $f_p/N$, where $f_p$ is the frequency $f_r$ of the reference oscillator times the divider ratio of programmed divider and N is the number of stages of the digital filter. Thus the remote station frequencies must be equally accurately set as by using crystal control. This aids in providing immunity to noise and to spurious signals which might be injected into the system by an intruder to try and give a false indication that all is normal. The frequency stability of the system enables further action to be taken to prevent an intruder ascertaining the reporter terminal carrier frequencies in order to try and inject false signals. This action is effected by the interference signal source 41 which applies to the cable 10 a signal having frequency components within the band occupied by the wanted reporter terminal frequencies and of substantially greater peak amplitude so that the wanted signals are apparently buried in the interfering signal as far as the intruder is concerned.

The source 41 may supply a noise signal, which in practice may be a pseudo-random noise signal, or a swept frequency signal. These signals do not upset the operation of the processing unit 40 which is looking only at the known wanted frequencies with a narrow bandwidth filter.

The normal and alarm signals above described may be varied. A continuous signal could indicate the normal condition and a pulsed signal, the alarm condition. The two conditions could be distinguished by two different pulsed signals.

While the remote stations have been described as operating continuously, they could be adapted to operate as transponders each remote station reporting its condition only when triggered into doing so by the central signal processing unit.

What is claimed is:

1. A monitoring system comprising:
    a plurality of detector units, a like plurality of condition responsive sensors individually associated with each detector unit, each detector unit including means for generating a signal at a frequency individual to and characteristic of that unit, and means for modulating the characteristic frequency signal produced by said signal generating means, said modulating means being responsive to a change from a first to a second condition of the associated sensor to provide a change from a first to a second modulation condition of said characteristic frequency signal;
    a signal processing unit, and communication means linking said detector units and said signal processing unit, said signal processing unit including frequency-selective filter means selectively operable at each of a plurality of discrete frequencies corresponding to the characteristic frequencies of said detector units to discriminate between said characteristic frequency signals from said detector units and provide corresponding filtered signals at an output of said filter means, and means connected to the output of said filter means for monitoring the modulation condition of each of said filtered signals and having a plurality of outputs individually associated with said plurality of discrete frequencies and selectable in synchronism with the selection of said discrete filter frequencies, whereby each of said plurality of outputs indicates the modulation condition of the associated filtered signal and thereby the condition of the sensor associated therewith.

2. A system as claimed in claim 1 wherein one of said modulation conditions of each characteristic frequency signal is a condition of no modulation.

3. A system as claimed in claim 2 wherein in the other of said modulation conditions each of said modulating means causes the associated characteristic frequency signal to be pulse modulated.

4. A system as claimed in claim 1 wherein each of said detector units further comprises a timing device coupled between said associated sensor and said modulating means responsive to a change from said first to said second condition of said sensor to actuate said modulating means from providing said first to providing said second modulation condition of said characteristic frequency signal for only a predetermined period of time.

5. A system as claimed in claim 1 wherein said modulation condition monitoring means comprises a bistable circuit associated with each of said detector units operable to adopt a first or a second state in response to the associated characteristic frequency signal being in said first or said second modulation condition, respectively.

6. A system as claimed in claim 3 wherein said first and second modulation conditions are the conditions of pulsed modulation and of no modulation, respectively, said signal processing unit further comprising a clock source coupled to said frequency-selective filter means to supply signals thereto to cause said filter means to scan said plurality of discrete frequencies in succession, and coupled to said modulation condition monitoring means to supply signals thereto to cause the successive selection of said plurality of outputs in synchronism with the selection of said plurality of discrete frequencies.

7. A system as claimed in claim 6 wherein said moudlation condition monitoring means includes a pulse-responsive circuit coupled to the output of said filter means to provide a first or a second output signal corresponding to a filtered signal being in the pulse modulated or unmodulated condition, reepectively, a plurality of bistable circuits each associated with a respective one of said detector units and providing said plurality of outputs, and a selector circuit coupled to said clock source to be stepped thereby to couple said pulse-responsive circuit to said bistable circuits in succession, whereby each bistable circuit adopts a state dependent on the presence of said first or second output signal obtained from said pulse-responsive means in response to the modulation condition of the characteristic frequency signal of the detector unit with which the bistable circuit is associated.

8. A system as claimed in claim 6 wherein said frequency-selective filter means comprises a digital filter and means for selecting the frequency of operation of the digital filter according to a predetermined program of said characteristic frequencies, said selecting means being coupled to said clock source to be stepped thereby through said perdetermined program.

9. A system as claimed in claim 8, wherein said characteristic frequency signal generating means in each of said detector units comprises a crystal-controlled oscillator.

10. A system as claimed in claim 1 wherein said signal processing unit comprises means coupled to the output of said filter means to indicate the absence of a signal at any one of said characteristic frequencies.

11. A system as claimed in claim 6 wherein said signal processing unit further includes means coupled to the output of said filter means to indicate the absence of a signal at any one of said characteristic frequencies.

12. A system as claimed in claim 1 wherein said characteristic frequency signals lie in a predetermined frequency band, and further comprising a further signal source coupled to said communication means linking said detector units and said signal processing unit to provide a signal having components extending over said frequency band and of substantially greater amplitude than said characteristic frequency signals.

13. A system as claimed in claim 12 wherein said signal source is a noise source.

14. A system as claimed in claim 12 wherein said signal source is a swept frequency source.

15. A system as claimed in claim 6 wherein said characteristic frequency signals lie in a predetermined frequency band, and further comprising a further signal source coupled to said communication means linking said detector units and said signal processing unit to provide a signal having components extending over said frequency band and of substantially greater amplitude than said characteristic frequency signals.

16. A system as claimed in claim 15 wherein said signal source is a noise source.

17. A system as claimed in claim 15 wherein said signal source is a swept frequency source.

18. A signal scanning circuit comprising: a digital filter; a frequency source coupled to said filter to control the filter frequency of said digital filter, said source including a programing unit for enabling the filter frequency to be selectable to one of a plurality of prescribed frequencies according to a prescribed program, a clock source connected to said programing unit to cause the latter to advance through its program to cause said digital filter to scan the prescribed frequencies according to the program, and analyser means coupled to said clock source and to the output of said digital filter, said analyser means having a plurality of outputs each associated with a respective one of said prescribed frequencies and being stepped by the clock to provide signals sequentially at said outputs in synchronism with the selection of the prescribed frequencies in the digital filter and said analyser means being operable to analyse the signal at the output of said digital filter at each prescribed frequency thereof and to produce a signal on the associated output indicative of the nature of the digital filter output signal.

19. A monitoring system comprising:
a plurality of detector units, a like plurality of condition responsive sensors individually associated with each detector unit, each detector unit including a crystal-controlled oscillator circuit for generating a signal at a frequency individual to and characteristic of that unit, and means for modulating the characteristic frequency signal produced by said signal generating means, said modulating means being responsive to a change from a first to a second condition of the associated sensor to provide a change from a first to a second modulation condition of said characteristic frequency signal;
a signal processing unit, and communication means linking said detector units and said signal processing unit;
said communication means including at least one source of noise providing noise signals of substantially greater amplitude than said characteristic frequency signals at said signal processing unit; and
said signal processing unit including a digital filter and means for controlling the filter frequency such that the digital filter discriminates between the signals at the characteristic frequencies of said detector units and provides corresponding filtered signals, and means responsive to the filtered signals to monitor the modulation condition of each filtered signal and thereby monitor the condition of the associated sensor.

20. A monitoring system as claimed in claim 19 wherein said at least one source of noise comprises a noise signal generator coupled to said communication means.

21. A monitoring system as claimed in claim 19 wherein said communication means is a power supply line.

* * * * *